Patented Sept. 23, 1947

UNITED STATES PATENT OFFICE 2,427,799

ZIRCONIUM SILICATE POLISHING MATERIAL AND PROCESS OF PREPARING SAME

William T. Maloney, Clinton, N. Y.

No Drawing. Application September 14, 1946, Serial No. 697,151

14 Claims. (Cl. 51—308)

The present invention relates to an improved polishing material particularly adapted for use in polishing optical glass and other glass products and to a process of preparing the same.

In polishing optical glass and similar glass products requiring an extremely smooth surface it has been the prevailing practice to use a specially prepared iron oxide rouge as the polishing material. This material has the disadvantage that it stains or discolors objects with which it comes into contact as well as the clothing of workers and others handling it or coming into contact with the walls or other surfaces upon which it becomes deposited. Because of its fineness it tends to be carried in the air throughout the building or vicinity in which it is being used, with the consequence that a glass polishing establishment is looked upon as something of a nuisance which adversely affects the desirability of adjacent space in a factory or other building in which it may be situated.

Attempts have been made from time to time to substitute as polishing materials, silica, specially prepared clays and similar materials that do not have an objectionable color. While certain of these materials serve the purpose satisfactorily from the standpoint of their polishing ability, their use generally has been limited either by reason of the public attitude toward silica-containing materials arising from the unfortunate experiences with silicosis under certain industrial conditions or because of other drawbacks found in some of these materials.

It is an object of the present invention to provide an improved polishing material which does not have the objectionable color of the iron oxide rouges and which at the same time may not be objected to as a possible health hazard.

It is a further object of the invention to provide a polishing material that has a polishing efficiency, in terms of the rate of polishing, at least the equal of the better grades of red oxide polishing rouges now available.

It is a still further object of the invention to provide a polishing material which will impart an exceptionally high brilliance to glass surfaces polished therewith.

Other objects and advantages of the invention will appear from the appended description.

I have found that zirconium silicate when ground and treated in the manner more particularly hereinafter described will become a glass polishing material which is fast cutting and capable of producing extremely smooth and brilliant surfaces of the highest quality on optical glass and other glass products.

In accordance with the invention I employ a granular zircon as the starting material for the production of the improved polishing material. Zircon is a naturally occurring zirconium silicate which occurs in the form of translucent yellowish crystals. The starting material for my purpose is preferably a zircon which is substantially free from impurities. The zircon is first reduced to a finely divided condition by any suitable means, as for example, by grinding the raw granular zircon in a ball mill until a large proportion of the material has been reduced to a size within the range suitable for glass polishing. Thereafter, the finely ground material is subjected to a classification treatment to recover the particles which are within the suitable particle size range from the coarser particles which would cause scratching of the glass surface being polished.

The classification is preferably carried out in the wet way and is facilitated by the addition of sodium silicate or a similar dispersing agent. The classification is controlled so as to insure precipitation of all grit and particles of such size as to interfere with the final polishing. For polishing optical glass I have found that the desired particle size fraction is insured when the zircon material, previously ground until all of the particles will pass a 325 mesh sieve, is suspended in water and dispersed by the addition of a suitable alkaline dispersing agent, whereupon the resulting dispersed suspension is allowed to stand until all particles coarser than 5 microns have settled out and the portion remaining in suspension shows a fineness of at least 90% minus 2 microns. The portion remaining in suspension is then recovered by decantation or in any other suitable manner.

The recovered fine fraction, either in the form of the aqueous suspension as recovered or after drying and later re-mixing with water to form a fresh suspension, is mixed with a relatively small amount of one or more of the sulfates or chlorides of the group including the following: cadmium sulfate, cadmium chloride, copper chloride, ferrous sulfate, zinc chloride, zinc nitrate, zinc sulfate and zinc acetate. The amount of the acid salt added should be sufficient to render the suspension definitely acid and preferably sufficient to bring the pH value of the suspension between 6 and 7. No advantage appears to result from making the suspension more acid.

After the suspension has been acidified as above described, the suspended fine particles may then be recovered by a suitable filtration treatment as by centrifuging, after which it is dried. After the drying step the finely divided and treated zirconium silicate is re-ground, preferably in a micro pulverizer and then is ready for use.

By way of specific example, a feed of granular zirconium silicate in the proportion of 20 lbs. of the silicate to 1 gal. of water is fed to a ball mill and ground until at least 60% is brought within the desired particle size range. The entire charge is then transferred to a tank or other suitable vessel provided with stirring apparatus. Sufficient water is added to form a suspension of about 4½ lbs. of zirconium silicate to 1 gal. of water. An aqueous solution of sodium silicate in an amount sufficient to bring the pH of the suspension to about 9–10 is added and the suspension is then thoroughly stirred. Thereupon the mixture is allowed to stand until the coarser particles have settled to the bottom of the vessel where they form a hard cake.

The length of time required to produce the desired separation by sedimentation will vary somewhat depending on the depth of the liquid contained in the settling tank and the extent to which the grinding may have been carried beyond an overall 325 mesh fineness. Assuming that the grinding has been stopped when 60% of the particles have been reduced to the desired fineness and that the dispersed liquid suspension stands to a depth of 14 inches in the settling tank, the particles coarser than 5 microns will usually have settled out within 55 minutes, leaving a finer particle portion in suspension of which at least 90% will be finer than 2 microns. When this degree of separation has occurred the liquid suspension is then draw off, acidified and filtered. The fine particles thus separated from the bulk of the water are further dried to drive off the remaining water.

The acidifying treatment consists in adding a sufficient quantity of one of the enumerated acid salts to bring the pH value of the liquid suspension down so that it is definitely on the acid side and preferably within the range of 6 and 7. In case a part of the acid salt is carried away in the filtrate during filtering, it may be necessary to add more of the salt to the fine fraction after filtering and before drying, or if preferred, the final addition of acid salt may be made after drying and shipment of the resulting polishing material to the place where it is to be used.

While it is essential in obtaining the enhanced polishing speed to return the pH of the material to the acid side, mere use of any acidifying agent indifferently will not insure the desired ultimate result. I have found that there are only a few acid salts that may be employed in obtaining the desired improvement in cutting speed and that others quite closely related in chemical classification do not behave in a similar manner. The specific nature of the action of the salts is indicated by the following comparative polishing results:

| | Glass removed [1] |
|---|---|
| $CdSO_4$ | .0804 |
| $CdCl_2$ | .0716 |
| $CnCl_2$ | .0754 |
| $FeSO_4$ | .0740 |
| $ZnCl_2$ | .0786 |
| $Zn(NO_3)_2$ | .0844 |
| $ZnSO_4$ | .0884 |
| $Zn(CH_3COO)_2$ | .0800 |
| Untreated [2] | .0650 |
| $Al_2(SO_4)_3$ | .0410 |
| $NiSO_4$ | .0512 |

[1] Grams removed from a 1⅞" spectacle lens blank in 10 minutes using a standard M422A bowl feed polisher made by the American Optical Company with gradual addition of 50 grams of the zirconium silicate polish suspended in 100 cc. of water.

[2] In this test the zirconium silicate had been ground, dispersed and classified to the same particle size and in the same way as the product used in the other tests but no acid salt had been added and the pH remained at about 7.2+.

The polishing rate obtained with the use of zirconium silicate treated in the manner above described compares very favorably with that obtainable with even the best of the red oxide polishing rouges and excels that obtained with many of those on the market. Besides this desirable characteristic and the absence of objectionable color, the zirconium silicate product has the further notable advantage over the prior polishing materials that it will impart exceptional brilliance to glass surfaces polished therewith. There is also an absence of any tendency for the so-called "orange peel" phenomenon to occur when the glass is polished under heavy loads as will occur at times when using various other polishing materials.

Instead of recovering the fine particle fraction directly by wet classification, the zirconium silicate material may be ground and then be subjected to air separation to obtain the fine fraction. The fraction so obtained should nevertheless be later dispersed in water with a suitable alkaline dispersing agent, preferably sodium silicate or potassium silicate, and brought definitely to the alkaline side for the later treatment with one of the effective acid salts above mentioned and also to facilitate the settling out of any remaining larger particles that would produce scratches on glass if present in the final product. The dispersing treatment may be postponed until the product is shipped to the polishing plant, where the dispersion and resulting wet classification and the subsequent acidifying treatment with the acid salt may be carried out. However, if the dispersion treatment is carried out before shipment, the manufacturer is better able to insure that any over-size particles present in the air separated finer fraction will be precipitated out before the product is prepared for shipment.

It is also to be understood that the addition of the acid salts need not be made while the polishing material is suspended in water. It may, if desired, be added to the dispersed fraction while it is being dried or may be added later in the dry state and thoroughly mixed with the dry, dispersed fine zirconium silicate material before shipment to the user.

In my U. S. Patent No. 2,399,237, dated April 30, 1946, I have disclosed a procedure having certain points of similarity as regards particle size and treatment designed to improve the grinding efficiency of polishing materials derived from silica sand. However, the present process involves something more than merely extending the procedure disclosed in my earlier patent to zirconium silicate. This is evident from the fact that certain of the acid salts found to work very well with silica are ineffective in improving the polishing value of zirconium silicate. At the same time certain of the salts found to have a pronounced effect on the characteristics of zirconium silicate material produce no noticeable beneficial effect on the polishing properties of silica.

So far as I am aware, no one had previously found that zirconium silicate had any utility whatsoever as a polishing material for glass. I also believe that I am the first to have recognized the importance of control of the particle size and its influence on the polishing properties of zirconium silicate and to have disclosed how the use of the dispersion treatment in obtaining a sharper separation of the finer fraction conduces to improvement of the polishing properties of zirconium silicate. Without such controlled fractionation and preliminary dispersion zirconium silicate would be without practical value as a glass polishing material. Therefore, I consider that my invention in its broader aspects includes the zirconium silicate polishing material which comprises the alkaline dispersed suspensoid fraction of the particle size hereinbefore specified irrespective of whether or not the material is further improved by a subsequent acidifying treatment with one of the specified acid salts.

I claim:

1. A polishing material capable of forming a smooth optical surface of high brilliance on glass which comprises a classified fraction of a finely subdivided zirconium silicate free from particles larger than 5 microns and at least 90% of which is of a fineness of 2 microns or less in diameter.

2. A polishing material capable of forming a smooth optical surface of high brilliance on glass which comprises a classified fraction of a finely subdivided zirconium silicate free from particles larger than 5 microns and at least 90% of which is of a fineness of 2 microns or less in diameter, and an acidifying agent selected from the group consisting of cadmium sulfate, cadmium chloride, copper chloride, ferrous sulfate, zinc chloride, zinc nitrate, zinc sulfate and zinc acetate.

3. A polishing material capable of forming a smooth optical surface of high brilliance on glass which comprises an alkaline dispersed suspensoid fraction of a classified finely divided zirconium silicate free from particles larger than 5 microns in diameter and at least 90% of which is of a fineness of 2 microns in diameter or less.

4. A polishing material capable of forming a smooth optical surface of high brilliance on glass which comprises an alkaline dispersed suspensoid fraction of a classified finely divided zirconium silicate free from particles larger than 5 microns in diameter and at least 90% of which is of a fineness of 2 microns in diameter or less, and an acidifying agent selected from the group consisting of cadmium sulfate, cadmium chloride, copper chloride, ferrous sulfate, zinc chloride, zinc nitrate, zinc sulfate and zinc acetate.

5. A polishing material capable of forming a smooth optical surface of high brilliance on glass which comprises an alkaline dispersed suspensoid fraction of a classified finely divided zirconium silicate free from particles larger than 5 microns in diameter and at least 90% of which is of a fineness of 2 microns in diameter or less, and an acidifying agent selected from the group consisting of cadmium sulfate, cadmium chloride, copper chloride, ferrous sulfate, zinc chloride, zinc nitrate, zinc sulfate and zinc acetate, in an amount sufficient to maintain the pH of the material below 7 in an aqueous medium.

6. A polishing material capable of forming a smooth optical surface of high brilliance on glass which comprises an alkaline dispersed suspensoid fraction of a classified finely divided zirconium silicate free from particles larger than 5 microns in diameter and at least 90% of which is of a fineness of 2 microns in diameter or less, and an amount of zinc sulphate sufficient to maintain the pH of the material below 7 in an aqueous medium.

7. A polishing material capable of forming a smooth optical surface of high brilliance on glass which comprises an alkaline dispersed suspensoid fraction of a classified finely divided zirconium silicate free from particles larger than 5 microns in diameter and at least 90% of which is of a fineness of 2 microns or less in diameter together with sufficient cadmium sulphate to maintain the pH of the material below 7 when in an aqueous medium.

8. A polishing material capable of forming a smooth optical surface of high brilliance on glass which comprises an alkaline dispersed suspensoid fraction of a finely divided zirconium silicate free from particles larger than 5 microns and of which 90% at least is of a fineness of 2 microns or less in diameter together with zinc nitrate in an aggregate amount sufficient to maintain the pH of the material below 7 when in an aqueous medium.

9. The process of preparing a polishing material capable of forming a smooth optical surface of high brilliance on glass which comprises grinding a zirconium silicate to produce therefrom a fraction of a fineness minus 325 mesh, classifying the finely divided zirconium silicate fraction thus obtained by suspending it in water in the presence of an alkaline dispersing agent under conditions permitting the larger particles to settle out of suspension, and thereafter treating the finer suspensoid fraction while in aqueous suspension with an acidic salt selected from the class consisting of cadmium sulfate, cadmium chloride, copper chloride, ferrous sulfate, zinc chloride, zinc nitrate, zinc sulfate and zinc acetate, and finally drying the finely divided zirconium silicate product thus produced.

10. The process of preparing a polishing material capable of forming a smooth optical surface of high brilliance on glass which comprises grinding a zirconium silicate to produce therefrom a fraction of a fineness minus 325 mesh, classifying the finely divided zirconium silicate by suspending it in water in the presence of sodium silicate under conditions permitting the larger particles to settle out of suspension, flocculating the suspension by the addition of zinc sulphate, and finally drying the finely divided zirconium silicate.

11. The method of improving the polishing efficiency of a zirconium silicate polishing material which comprises suspending a classified fraction of finely divided zirconium silicate particles, none of which is larger than 5 microns and at least 90% have a fineness of 2 microns in diameter or less, in water in the presence of an alkaline dispersing agent, and thereafter treating the material with an acid salt selected from the group consisting of cadmium sulfate, cadmium chloride, copper chloride, ferrous sulfate, zinc chloride, zinc nitrate, zinc sulfate and zinc acetate, in sufficient amount to impart a pH value of not more than 7 when the said fraction is suspended in water.

12. The method of improving the polishing efficiency of a zirconium silicate polishing material which comprises suspending a classified fraction of finely divided zirconium silicate particles, none of which is larger than 5 microns and at least 90% have a fineness of 2 microns or less, in water in the presence of sufficient sodium silicate to increase the pH value of the suspension to at least 9 and thereafter treating the material with an amount of zinc sulfate sufficient to bring the pH of the material below 7 when suspended in an aqueous medium.

13. The method of improving the polishing efficiency of a zirconium silicate polishing material which comprises suspending a classified fraction of finely divided zirconium silicate particles, none of which is larger than 5 microns and at least 90% have a fineness of 2 microns or less, in water in the presence of sufficient sodium silicate to increase the pH value of the suspension to at least 9 and thereafter treating the material with an amount of cadmium sulfate sufficient to bring the pH of the material below 7 when suspended in an aqueous medium.

14. The method of improving the polishing efficiency of a zirconium silicate polishing material which comprises suspending a classified fraction of finely divided zirconium silicate particles, none of which is larger than 5 microns and at least 90% have a fineness of 2 microns or less, in water in the presence of sufficient sodium silicate to increase the pH value of the suspension to at least 9 and thereafter treating the material with an amount of zinc nitrate sufficient to bring the pH of the material below 7 when suspended in an aqueous medium.

WILLIAM T. MALONEY.